3,160,579
HYDROGENATION PROCESS

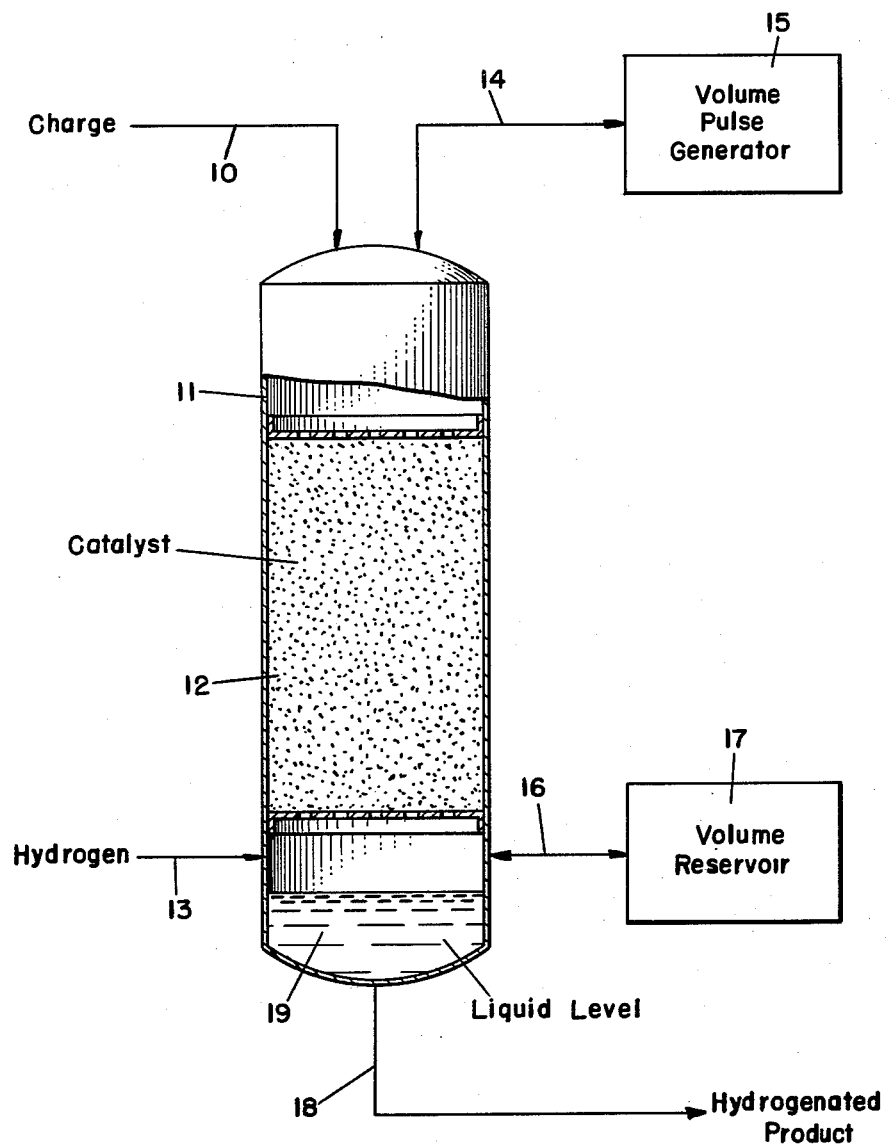

James Van Dyck Fear, Media, Pa., assignor to Sun Oil Company, Philadelphia, Pa., a corporation of New Jersey
Filed Aug. 31, 1961, Ser. No. 135,232
4 Claims. (Cl. 208—143)

This invention relates to a hydrogenation process. It particularly relates to a process for hydrogenating hydrocarbon oils containing unsaturated constituents. It especially relates to an improved manner of conducting processes wherein hydrocarbon material is contacted in liquid phase with a stationary bed of solid hydrogenation catalyst in the presence of hydrogen-containing gas.

It is known in the art to contact hydrocarbon materials with hydrogen in the presence of a catalyst by passing the hydrogen and hydrocarbon materials through a stationary bed of solid catalyst. Generally, the oil to be treated is in the vapor phase in order to achieve a relatively high rate of reaction and to materially decrease the deactivation rate of the catalyst. However, a main disadvantage of vapor phase hydrogenation is that the process requires an extremely large amount of hydrogen, i.e., 3,000–10,000 standard cubic feet per barrel of oil for, say, effective desulfurization of the oil, in order to achieve satisfactory hydrogenating efficiency. The prior art also recognized that hydrogenation of hydrocarbon oil could be accomplished in liquid phase such as by filling a reactor containing a catalyst with liquid hydrocarbon and then bubbling hydrogen gas through the liquid phase. The reaction rate was found to be exorbitantly low and is apparently only practical if very mild hydrogenation of the oil is desired. In order to achieve the desired extent of hydrogenation, it is often desirable to increase the amount of hydrogen in contact with the oil by (1) increasing the hydrogen flow rate using the well-known recycle hydrogen technique and (2) decreasing the oil flow rate such that the oil will trickle over the catalyst in thin flowing films of oil.

The present invention provides a novel and superior manner of accomplishing liquid phase hydrogenation of hydrocarbon oils utilizing a volume pulse of hydrogen gas to increase the contact between the hydrogen and the oil. Preferably the present invention involves no hydrogen recycle.

The term "volume pulse," as used herein, includes any method or mechanism which causes the flow of hydrogen gas within the reaction zone to alternately reverse flow direction in relatively small cycles or pulses.

The invention will be further described with reference to the attached drawing, which is a schematic illustration of the process according to one embodiment of the invention.

Referring to the drawing, solid granular hydrogenation catalyst having size, for example, within the approximate range from 4 to 10 mesh, is disposed in a stationary bed 12 filling vessel 11. A hydrocarbon charge stock is introduced through line 10 into the top of vessel 11 and passes downwardly in liquid phase, trickling over the catalyst, and forms a liquid level 19 in the bottom of vessel 11. Preferably, liquid level 19 does not occupy any substantial portion of bed 12. Hydrogen gas is introduced through line 13 into vessel 11 such that the void area within the catalyst bed 12 is filled with a relatively static atmosphere of hydrogen. Sufficient hydrogen is added in order to fill volume pulse generator 15. Volume reservoir 17 remains substantially empty.

At this stage in the process, volume pulse generator 15 is started. On the downstroke, hydrogen flows out of the generator 15 through line 14 into vessel 11 downward through catalyst bed 12, concurrently with the downward flowing hydrocarbon oil, and out of vessel 11 into volume reservoir 17 via line 16. The hydrogenated product is continually withdrawn through line 18 from the bottom of vessel 11.

The volume pulse is now reversed. Hydrogen gas flows out of volume reservoir 17 through line 16 into vessel 11 wherein it passes upwardly through catalyst bed 12, countercurrent to the downward flowing hydrocarbon oil, and out of vessel 11 into volume generator 15 via line 14. The pulsing cycle is now repeated.

According to the invention, the volume pulse rate may be within the range from 10 to 10,000 pulses per minute depending upon the desired degree of hydrogenation. Usually a rate between 2,000 and 4,000 pulses per minute will be satisfactory. However, the pulsing rate must be of a rate below that rate which would cause any movement of the catalyst granules.

Thus, the present invention is based on the improvement which comprises causing the hydrogen gas to alternately reverse flow direction within the fixed bed of solid catalyst. In this manner, hydrogenating efficiency is significantly increased over that obtainable from prior art processes.

In the drawing, volume pulse generator 15 is positioned at the top of the reactor; and the reservoir is placed at the bottom. It is to be understood, however, that generator 15 may be placed at either end of the reactor with reservoir 17 placed at the opposite end. In addition, volume reservoir 17 can be of any size but should be of such a volume that during the pulsing operation, the reactor remains essentially at constant pressure.

As used herein, the volume pulse generator can be of any type known to the art. Advantageously, the volume generator is a long stroke piston arrangement such that the stroke of the piston moves the entire body of gas within the reactor bed a finite distance which must be less than the length of the reaction zone. Usually the volume of gas moved is 0.001 to 0.5 times the volume of the reaction zone. The piston is driven by any suitable power source (not shown) such as an electric motor, gas turbine, reciprocating engine, or the like.

Further, as used herein, the term "static atmosphere" of hydrogen is one in which a gaseous atmosphere of hydrogen is maintained within the void space between the catalyst granules and is not removed therefrom with the oil stream. In other words, the process is operated so that substantially all of the remaining unreacted hydrogen is retained within the hydrogenation zone. Thus, in the preferred embodiment, only a liquid stream of at least partially hydrogenated oil is removed from the reaction chamber. If desired, a bleed stream of gas can be utilized to remove, say, $H_2S$. It is to be understood, however, that a minor amount of active circulation occurs as a result of the pulsing operation and as a result of adding new hydrogen under pressure to the reactor to replace the hydrogen absorbed in the hydrocarbon oil.

The process of this invention is suitable for any process involving the contacting of hydrogen and liquid hydrocarbons. Thus, for example, lubricating oils can be decolorized and/or desulfurized; unsaturated aliphatic or aromatic constituents in gasoline may be saturated; linseed oil can be converted to a solid; the hydrocarbons $C_{17}H_{32}$ and $C_{17}H_{30}$ can be converted to heptadecane; the ethyl ester of linoleic acid can be converted into the ethyl ester of stearic acid; paraffin wax with a 40° C. solidifying point can be converted into paraffin wax having a 43° C. solidifying point; and so forth.

The particular operating conditions for the hydrogenating reaction are well known to those skilled in the art. For example, the desulfurization of lubricating oils, e.g., those boiling between 400° F. and 800° F., is performed at temperatures ranging from 500° F. to 1,000° F. and pressures from 150 p.s.i.g. to 10,000 p.s.i.g. On the other hand, the hardening of vegetable and marine oils is performed at temperatures ranging from 100° F. to 400° F. and at slightly elevated pressures, e.g., 50 to 150 p.s.i.g. Liquid hourly space velocities may vary from 0.1 to 20. Those skilled in the art know how to choose the proper operating conditions according to the components of the system.

According to the invention, instead of using pure hydrogen, water gas or other commercial gas mixture containing hydrogen may be employed. Usually the gas mixture contains at least 40 percent hydrogen.

The following examples illustrate the invention:

Example 1

A furfural refined and dewaxed distillate from Mid-Continent crude petroleum having a boiling range of 600° F. to 800° F., Saybolt Universal Viscosities at 100° F. of 100 seconds and at 210° F. of 39 seconds, an API gravity of 33, a sulfur content of 0.1 percent, and 12 percent aromatic hydrocarbons is contacted with a hydrogenation catalyst comprising 12.5 percent cobalt molybdate on alumina and disposed in a hydrogenation zone in the presence of hydrogen gas. However, a volume pulse generator is not utilized.

The hydrogenation is performed at 800 p.s.i.g., and a liquid hourly space velocity of 1 (based on the volume of catalyst in the vessel), the charge stock being preheated to 675° F. Since the hydrogenation reaction is exothermic, the liquid temperature may increase somewhat as the liquid descends through the bed. Hydrogen-containing gases are introduced at a temperature of 225° F. as needed to maintain the desired pressure.

The reaction consumed about 30 standard cubic feet per barrel of hydrogen and yielded a product which contained less sulfur than the charge stock, e.g., 0.05 percent sulfur, and had improved oxidation stability.

Example 2

The process of Example 1 is repeated except that the hydrogen gas is pulsed as previously described at a rate of 2,500 pulses per minute. Hydrogen consumption is significantly higher than in Example 1, and the hydrogenated product recovered contained less sulfur, e.g., <0.05 percent sulfur, than the product from Example 1 and was materially more stable to oxidation than the product from Example 1.

Any suitable hydrogenation catalyst can be employed in the process according to the invention, e.g., cobalt, molybdenum, platinum, iron, nickel, oxides or sulfides of such metals, etc. Conventional carriers for the catalyst can also be employed, e.g., silica gel, alumina, bauxite, clay, activated carbon, etc.

I claim:
1. Process for hydrogenating a hydrocarbon oil which comprises:
    (a) feeding said oil in liquid phase into the hydrogenating zone containing a fixed bed of granular hydrogenating catalyst in such manner that said oil forms thin flowing films around the catalyst granules without filling the voids in said bed to any substantial extent,
    (b) feeding hydrogen-containing gas into said zone in an amount sufficient to maintain a static atmosphere of hydrogen within said zone,
    (c) reacting said oil and hydrogen-containing gas in the presence of the catalyst and under such conditions of temperature and pressure whereby said oil is at least partially hydrogenated,
    (d) imposing on said zone a volume pulse to alternately reverse the directional flow of the hydrogen-containing gas within the bed,
    (e) retaining substantially all of the remaining hydrogen in said zone, and,
    (f) removing from the zone hydrocarbon oil which has been at least partially hydrogenated as the sole product.
2. Process according to claim 1 wherein the reversal of the direction flow of the hydrogen is effected by a volume pulse of a rate below that rate which would cause any movement of the catalyst granules.
3. Process according to claim 2 wherein said volume pulse is at a rate of from 10 to 10,000 pulses per minute.
4. Process according to claim 2 wherein said volume pulse is at a rate from 2000–4000 pulses per minute.

References Cited in the file of this patent
UNITED STATES PATENTS

| | | |
|---|---|---|
| 2,899,380 | Lanning | Aug. 11, 1959 |
| 2,918,425 | Berger et al. | Dec. 22, 1959 |